(12) United States Patent
Kim et al.

(10) Patent No.: US 11,819,876 B2
(45) Date of Patent: Nov. 21, 2023

(54) SLOT DIE COATING DEVICE HAVING AIR VENT

(71) Applicant: LG Energy Solution, Ltd., Seoul (KR)

(72) Inventors: Ki Tae Kim, Daejeon (KR); Do Hyun Lee, Daejeon (KR); Taek Soo Lee, Daejeon (KR); Cheolwoo Kim, Daejeon (KR); Sang Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 108 days.

(21) Appl. No.: 17/431,561

(22) PCT Filed: May 12, 2020

(86) PCT No.: PCT/KR2020/006208
§ 371 (c)(1),
(2) Date: Aug. 17, 2021

(87) PCT Pub. No.: WO2020/231141
PCT Pub. Date: Nov. 19, 2020

(65) Prior Publication Data
US 2022/0134378 A1  May 5, 2022

(30) Foreign Application Priority Data
May 14, 2019 (KR) .......................... 10-2019-0056451

(51) Int. Cl.
*B05C 5/02* (2006.01)
*H01M 4/04* (2006.01)
(Continued)

(52) U.S. Cl.
CPC .......... *B05C 5/0254* (2013.01); *B05C 1/0813* (2013.01); *B05C 5/0241* (2013.01);
(Continued)

(58) Field of Classification Search
CPC ... B05C 5/0254; B05C 5/0245; B05C 1/0813; B05C 9/06; B05C 5/0241; H01M 4/0404;
(Continued)

(56) References Cited

U.S. PATENT DOCUMENTS 6,540,833 B1 * 4/2003 Gibson ................... B05C 13/00
118/712
2006/0257574 A1 11/2006 Pekurovksy et al.
(Continued)

FOREIGN PATENT DOCUMENTS

CN 109261438 A 1/2019
JP 2006212592 A 8/2006
(Continued)

OTHER PUBLICATIONS

Search Report dated May 30, 2022 from the Office Action for Chinese Application No. 202080012154.6 dated Jun. 6, 2022, pp. 1-2.
(Continued)

*Primary Examiner* — Laura Edwards
(74) *Attorney, Agent, or Firm* — Lerner David LLP

(57) ABSTRACT

The present disclosure relates to a slot die coating apparatus for coating an electrode active material slurry onto an electrode collector, the slot die coating apparatus including a coating roller, a die comprising a lower discharge opening, through which a first electrode active material slurry is discharged, and an upper die located on the upper side of the lower die and having an upper discharge opening, through which a second electrode active material slurry is discharged, and an upper air vent may be installed in the upper die and a lower air vent may be installed in the lower die.

10 Claims, 13 Drawing Sheets

(51) Int. Cl.
  *B05C 1/08* (2006.01)
  *B05C 9/06* (2006.01)
(52) U.S. Cl.
  CPC .......... *B05C 5/0245* (2013.01); *H01M 4/0404* (2013.01); *H01M 4/0409* (2013.01); *B05C 9/06* (2013.01)
(58) Field of Classification Search
  CPC ...... H01M 4/0409; Y02E 60/10; B29C 48/08; B29C 48/21; B29C 48/908; B29C 33/10; B29C 48/76
  USPC .......................................... 118/315, 411, 412
  See application file for complete search history.

(56) References Cited

U.S. PATENT DOCUMENTS

| | | |
|---|---|---|
| 2013/0025535 A1 | 1/2013 | Choi et al. |
| 2014/0131464 A1 | 5/2014 | Nagata et al. |
| 2018/0250701 A1 | 9/2018 | Kuenne |
| 2019/0351446 A1 | 11/2019 | Lee et al. |

FOREIGN PATENT DOCUMENTS

| | | |
|---|---|---|
| JP | 2007504001 A | 3/2007 |
| JP | 2008142648 A | 6/2008 |
| JP | 2012120980 A | 6/2012 |
| JP | 2013188663 A | 9/2013 |
| JP | 2014229479 A | 12/2014 |
| JP | 2015157270 A | 9/2015 |
| JP | 2016073951 A | 5/2016 |
| JP | 6046573 B2 | 12/2016 |
| JP | 6055280 B2 | 12/2016 |
| JP | 2018144030 A | 9/2018 |
| KR | 20110002935 A | 1/2011 |
| KR | 101107651 B1 | 1/2012 |
| KR | 20120003217 A | 1/2012 |
| KR | 20150105794 A | 9/2015 |
| KR | 20160099852 A | 8/2016 |
| KR | 20190019827 A | 2/2019 |

OTHER PUBLICATIONS

Extended European Search Report including Written Opinion for Application No. 20805781.0 dated Mar. 14, 2022, pp. 1-10.
International Search Report for Application No. PCT/KR2020/006208, dated Aug. 3, 2020, 10 pages.

* cited by examiner

[FIG. 4]
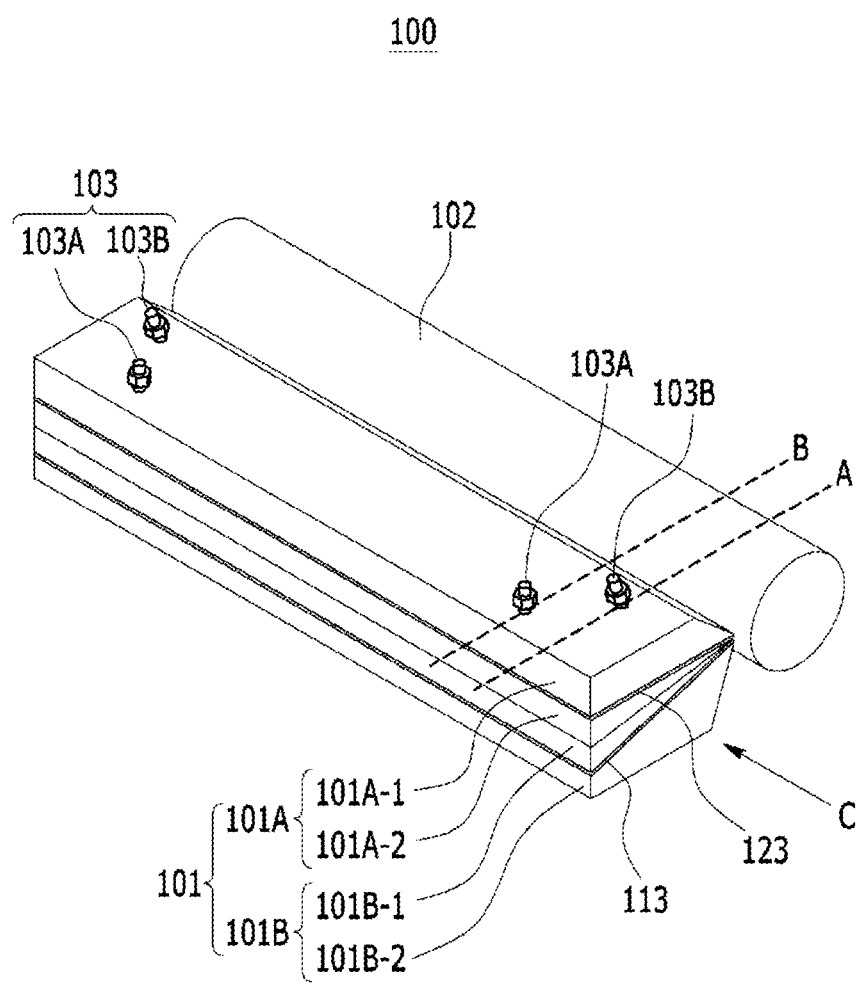

[FIG. 5]
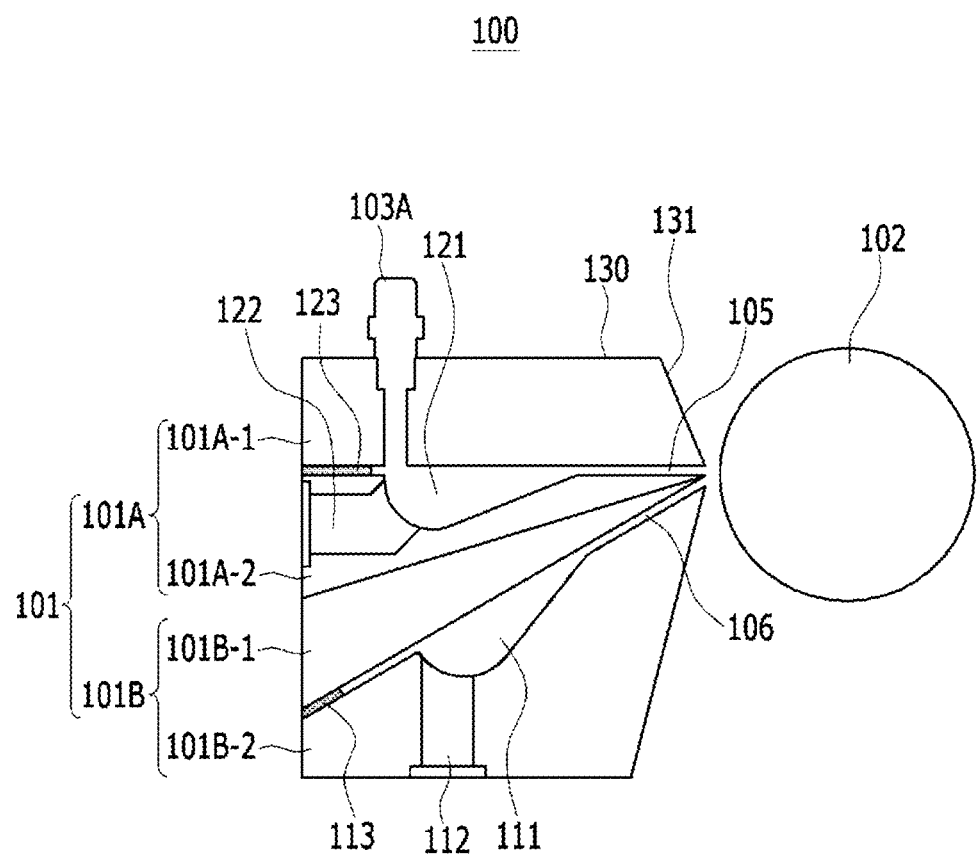

[FIG. 6]
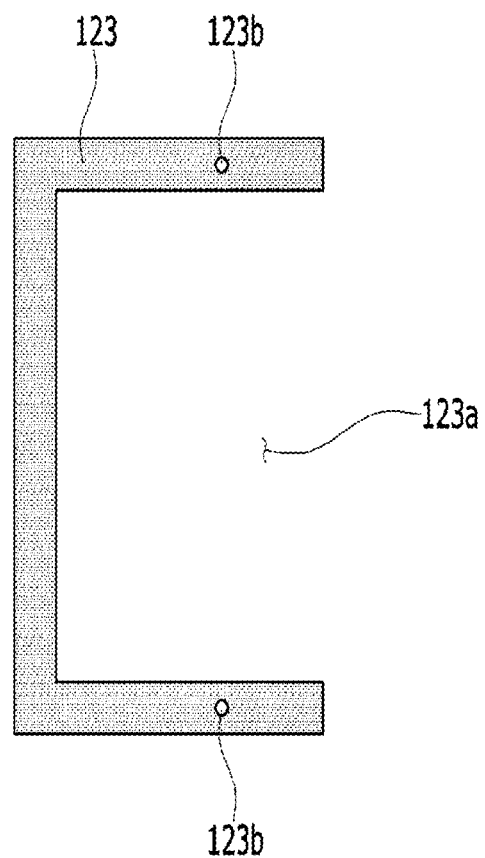

[FIG. 7]
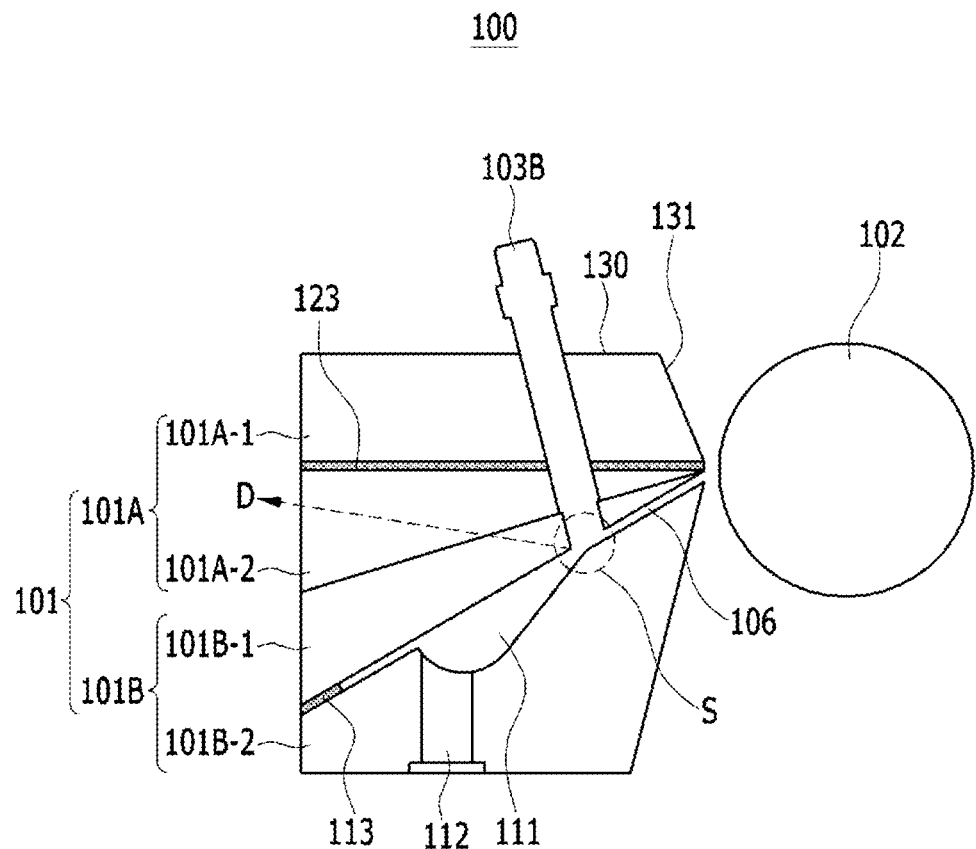

[FIG. 8]
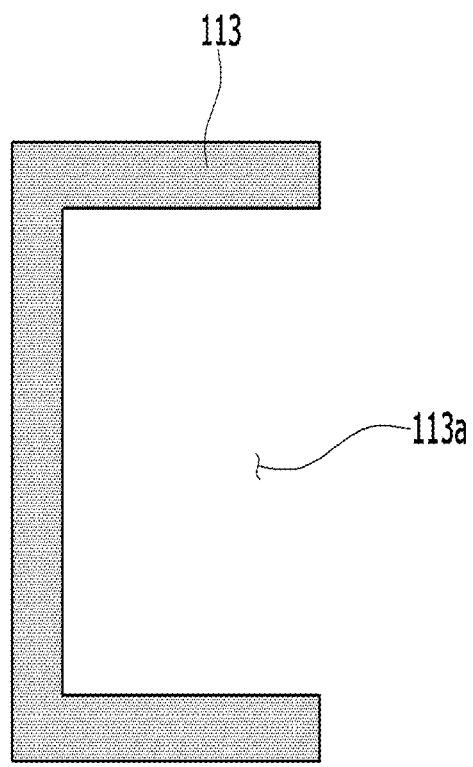

[FIG. 9]
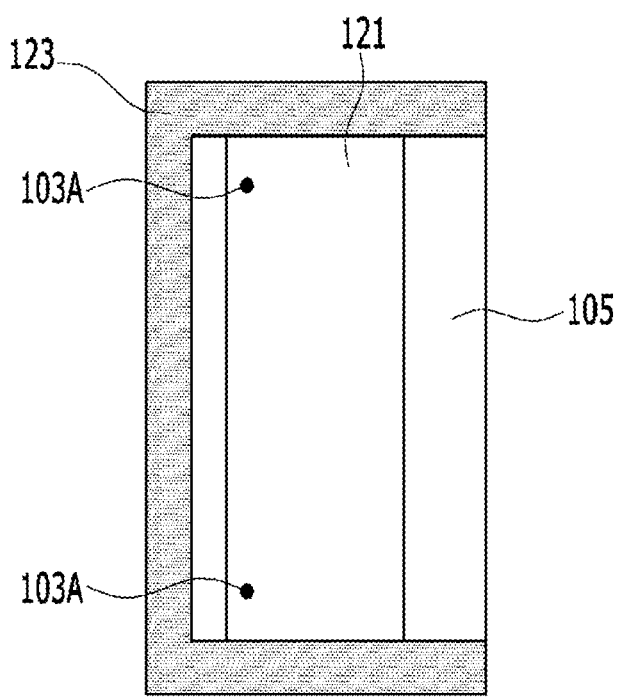

[FIG. 10]
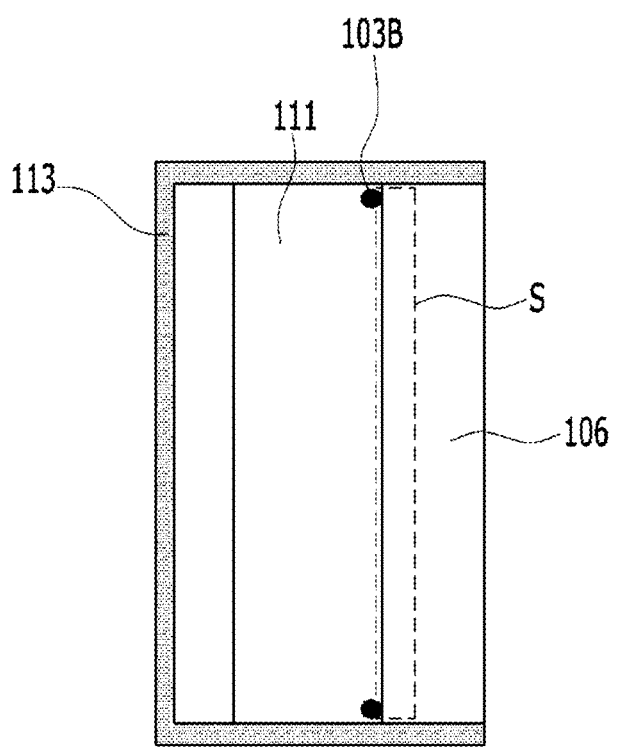

[FIG. 11]
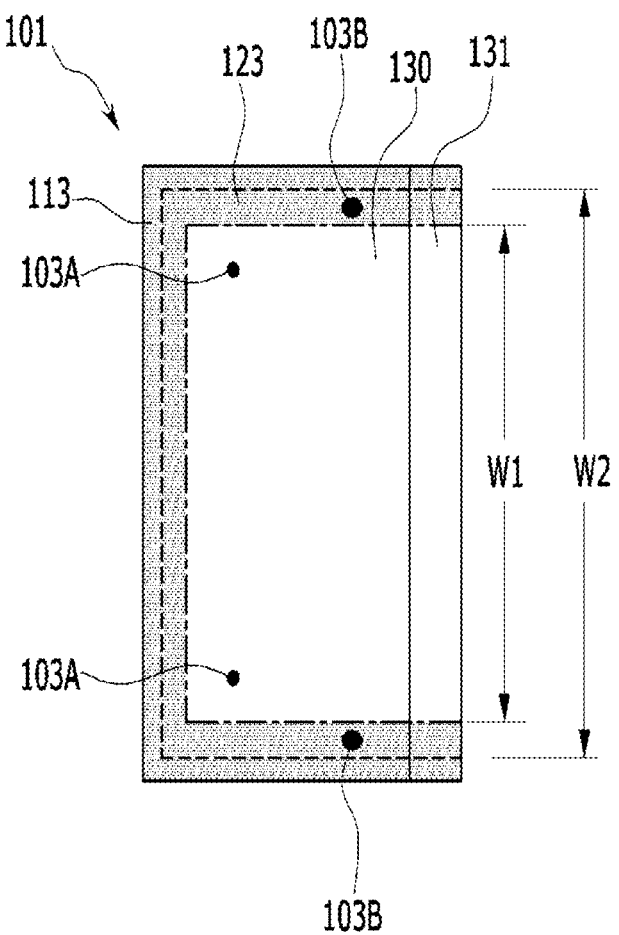

[FIG. 12]
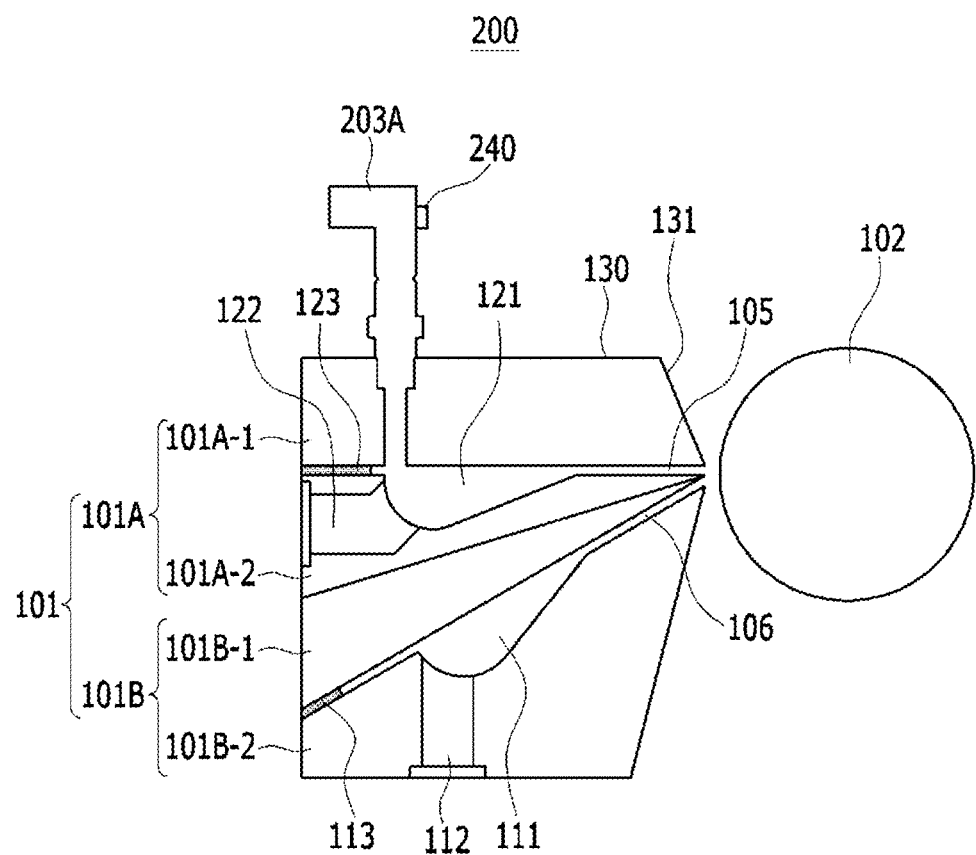

[FIG. 13]
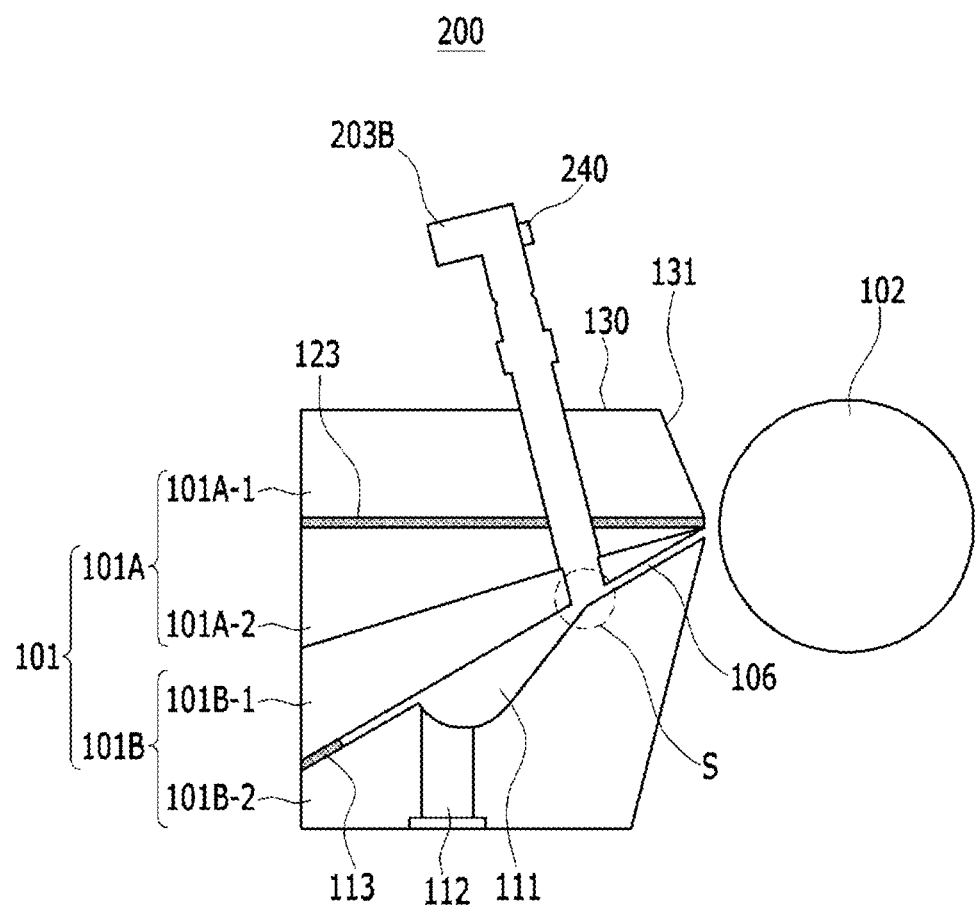

SLOT DIE COATING DEVICE HAVING AIR VENT

CROSS-REFERENCE TO RELATED APPLICATIONS

The present application is a national phase entry under 35 U.S.C. § 371 of International Application No. PCT/KR2020/006208, filed on May 12, 2020, which claims priority from Korean Patent Application No. 10-2019-0056451, filed on May 14, 2019, the disclosures of which are incorporated herein by reference in their entirety.

TECHNICAL FIELD

The present disclosure relates to a slot die coating apparatus including an air vent.

BACKGROUND ART

As energy prices are increasing due to the depletion of fossil fuels and increasing attention is being paid to environmental pollution, the demand for environmentally-friendly alternative energy sources acts as an essential factor for future life. Thus, research into techniques for generating various kinds of power, such as nuclear energy, solar energy, wind energy, and tidal power, is underway, and power storage apparatuses for more efficient use of the generated energy are also drawing much attention.

Moreover, the demand for batteries as energy sources is rapidly increasing as mobile device technology continues to develop and the demand for such mobile devices continues to increase. Accordingly, much research on batteries capable of satisfying various needs has been carried out. In particular, in terms of the material for batteries, the demand for lithium secondary batteries, such as lithium ion batteries and lithium ion polymer batteries, which have advantages such as high energy density, discharge voltage, and output stability, is very high.

A secondary battery includes an electrode assembly having a structure, in which an anode, a cathode, and a separator interposed between the anode and the cathode are stacked, and the electrode assemblies are received in a pouch case, a cylindrical shape can, a prismatic case, and the like depending on the purpose of use to manufacture the battery.

The anode and the cathode are manufactured by coating an anode slurry and a cathode slurry onto an electrode collector formed of aluminum foil and copper foil, and drying the anode slurry and the cathode slurry, respectively. In order to make the charge and discharge characteristics of the secondary battery uniform, an anode active material slurry and a cathode active material slurry have to be uniformly coated on the collector, and a slot die coating process is commonly performed to achieve this.

FIG. 1 is a longitudinal sectional view illustrating a slot die coating apparatus according to the related art, which is used in a process of coating a single layer active material. FIG. 2 is a longitudinal sectional view illustrating a slot die coating apparatus according to the related art, which is used in a process of coating a multilayer active material.

The slot die coating apparatus 10 includes a slot die 11, from which the electrode active material slurry is discharged, and a coating roller 12. The slot die 11 includes two die blocks 11a and 12a, and a discharge opening 13, from which the electrode active material slurry (not illustrated) is discharged, is formed between a first die block 11a and a second die block 11b. The electrode active material slurry discharged from the discharge opening 13 is applied to one surface of the collector 30 while the coating roller 12 rotates.

If necessary, an electrode active material layer constituting an additional layer is additionally applied onto an electrode active material layer constituting a single layer to form an electrode active material layer having two layers. In order to form the electrode active material layer having two layers, the slot die 21 including four die blocks 21a, 32b, 21c, and 21d as illustrated in FIG. 2 is used. The slot die 21 may continuously apply an additional electrode active material slurry onto the electrode active material slurry applied in advance by simultaneously discharging the electrode active material slurry through two discharge openings 23 and 24 formed between die blocks 2a, 21b, 21c, and 21d, which are adjacent to each other.

FIG. 3 is a picture illustrating contamination of an uncoated area, which is caused when intermittent coating is performed by using the slot die coating apparatus in FIGS. 1 and 2.

Referring to FIGS. 1 and 3, the uncoated area 31, in which the electrode active material slurry is not coated, is formed in the collector 30, when fully intermittent coating is performed by using the slot die coating apparatuses 10 and 20. Then, when bubbles are present in the electrode active material slurry, the bubbles burst while being discharged from the discharge openings 13, 23, and 24 in a section, in which the uncoated area 31 is formed. Then, contamination, in which the electrode active material slurry surrounding the bubbles is partially coated to the uncoated area 31 like a mottle 40, is caused.

In a process of coating an electrode active material, because a distance between the discharge openings 13, 23, and 24 and the collector 30 is generally a distance D of 100 µm to 200 µm, the above-mentioned contamination is caused by fine bubbles.

Accordingly, it is urgently necessary to develop a slot die apparatus having an improved structure that can solve the above-mentioned problems.

DETAILED DESCRIPTION OF THE INVENTION

Technical Problem

It is an object of the present disclosure to provide a slot die coating apparatus that can prevent an uncoated area section from being contaminated by electrode active material slurry in a process of intermittently coating an electrode active material.

However, the problem to be solved by the embodiments of the present disclosure is not limited to the above-described problems, and can be variously expanded within the scope of the technical idea included in the present disclosure.

Technical Solution

A slot die coating apparatus according to an embodiment of the present disclosure relates to a slot die coating apparatus for coating an electrode active material slurry onto an electrode collector, and the slot die coating apparatus including a coating roller, a die including a lower discharge opening, through which a first electrode active material slurry is discharged, and an upper die located on the upper side of the lower die and having an upper discharge opening, through which a second electrode active material slurry is discharged.

An upper air vent may be installed in the upper die and a lower air vent may be installed in the lower die.

The upper die may include an upper first die, an upper second die, and an upper spacer.

The upper discharge opening may be formed by sequentially coupling the upper first die, the upper spacer, and the upper second die.

An upper slurry receiving part may be formed in the upper second die.

The upper slurry receptor may be communicated with the upper discharge opening.

The upper air vent may pass through the upper first die to be communicated with the upper slurry receptor.

The lower die may include a lower first die, a lower second die, and a lower spacer.

The lower discharge opening may be formed by sequentially coupling the lower first die, the lower spacer, and the lower second die.

A lower slurry receptor may be formed in the lower second die.

The lower slurry receptor may be communicated with the lower discharge opening.

The lower air vent may pass through the upper first die, the upper second die, and lower first die to be communicated with the lower slurry receptor.

The lower air vent may be formed at a portion S at which the lower slurry receptor and the lower discharge opening are connected to each other.

The upper spacer may include a first opening and may be interposed in only the remaining part except for one side of a peripheral area in which the upper first die and the upper second die face each other.

The lower air vent may be installed to pass through the upper spacer.

The upper air vent and/or the lower air vent may include a valve.

Advantageous Effects

As described above, the slot die coating apparatus according to the embodiments of the present disclosure can remove bubbles included in the electrode active material slurry introduced into the discharge opening by installing the air vent in the slot die.

BRIEF DESCRIPTION OF THE DRAWINGS

FIG. 4 is a schematic diagram illustrating the slot die coating apparatus according to an embodiment of the present disclosure;

FIG. 5 is a longitudinal sectional view along dotted line A of FIG. 4 is viewed from direction C;

FIG. 6 is a plan view illustrating an upper spacer of FIG. 5;

FIG. 7 is a longitudinal sectional view when a vertical section along dotted line B of FIG. 4 is viewed from direction C;

FIG. 8 is a plan view illustrating a lower spacer of FIG. 7;

FIG. 9 is a plan view illustrating that an upper spacer is located on a second upper die;

FIG. 10 is a plan view illustrating that the lower spacer is located on a second lower die.

FIG. 11 is a plan view of a slot die of FIG. 4;

FIG. 12 is a vertical sectional view illustrating a modification of FIG. 5; and

FIG. 13 is a vertical sectional view illustrating a modification of FIG. 7.

DETAILED DESCRIPTION OF THE EMBODIMENTS

Figure 1:
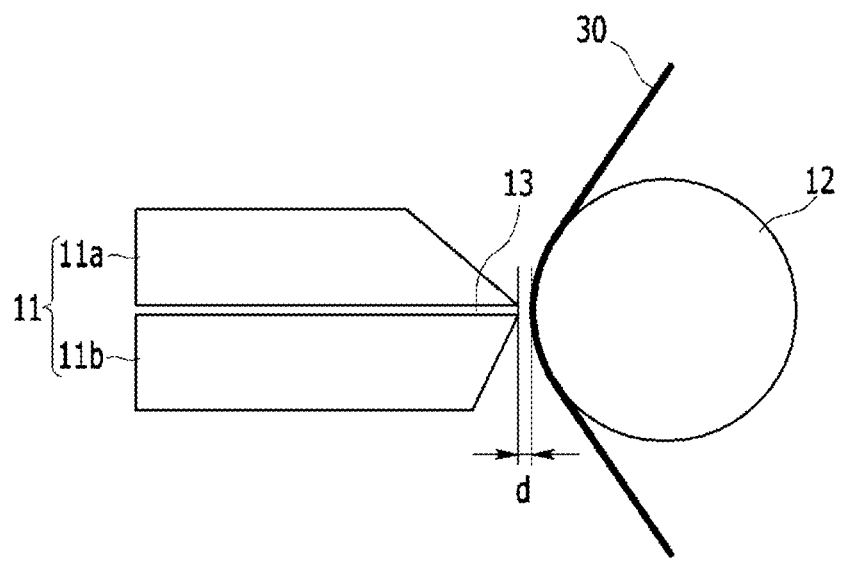
FIG. 1 is a longitudinal sectional view illustrating a slot die coating apparatus according to the related art, which is used in a process of coating a single layer active material.
Figure 2:
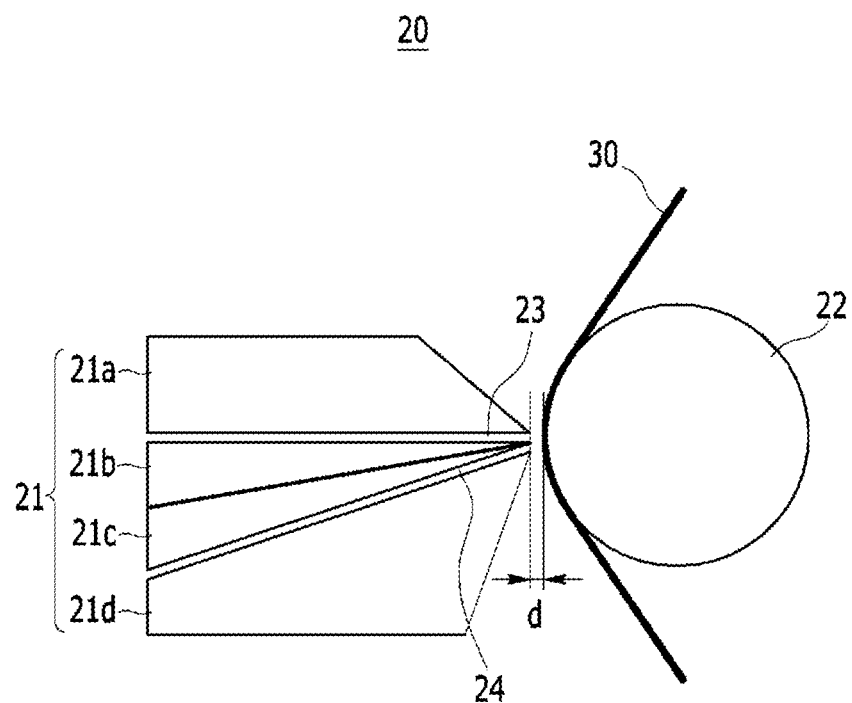
FIG. 2 is a longitudinal sectional view illustrating a slot die coating apparatus according to the related art, which is used in a process of coating a multilayer active material.
Figure 3:
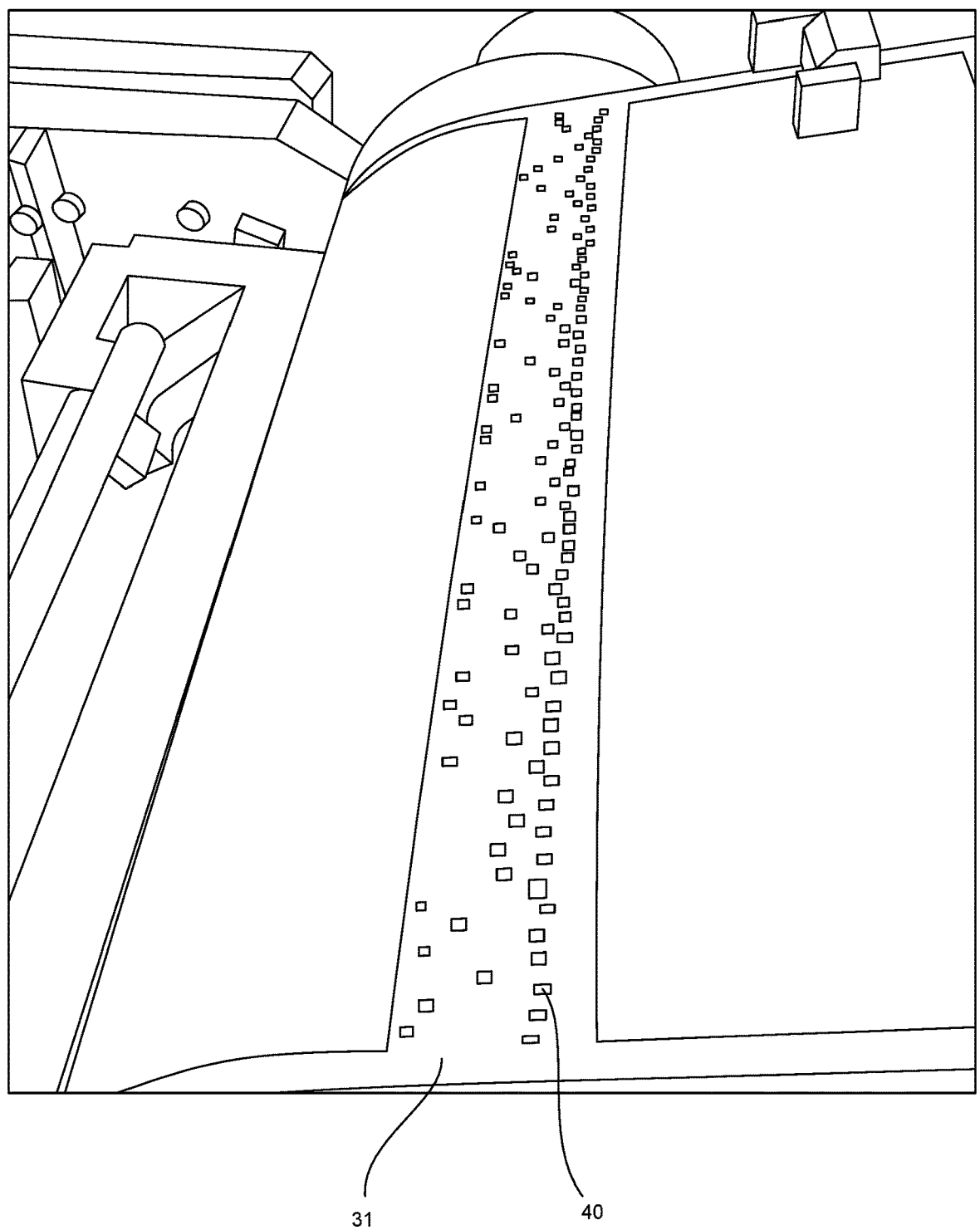
FIG. 3 is a picture illustrating contamination of the uncoated area, which occurs when being intermittently coated by using the slot die coating apparatus in FIG. 2.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when a part is referred to as "including" a certain component, it means that it can further include other components, without excluding the other components, unless otherwise stated.

FIG. 4 is a schematic diagram illustrating a slot die coating apparatus according to an embodiment of the present disclosure. FIG. 5 is a longitudinal sectional view when a vertical section along dotted line A of FIG. 4 is viewed from direction C.

Referring to FIGS. 4 and 5, the slot die coating apparatus 100 includes a slot die 101, a coating roller 102, and an air vent 103. The slot die coating apparatus 100 is used to simultaneously coat and fix two electrode active material layers.

The slot die 101 includes an upper die 101A and a lower die 101B. The upper die 101A includes a first upper die 101A-1, a second upper die 101A-2, and an upper spacer 123. The second upper die 101A-2 may have an inclined structure, in which a surface of the second upper die 101A-2, which faces a first lower die 101B-1, has the angle of approximately 30 to 60 degrees with respect to the ground surface.

The second upper die 101A-2 may include a recessed upper slurry receiving part 121, which has a predetermined depth on a surface of the second upper die 101A-2, which faces the first upper die 101A-1. The upper slurry receiving part 121 may be connected to an upper slurry supply chamber (not illustrated) installed on the outside to continuously receive a first electrode active material slurry. The upper slurry receiving part 121 may include an upper slurry supply port 122 communicated with the upper slurry supply chamber (not illustrated).

If the upper slurry receiving part 121 is fully filled with the first electrode active material slurry supplied through the upper slurry supply port 122, the first electrode active material slurry moves in a direction, in which the coating roller 102 is installed, through an upper discharge opening 105 formed by sequentially coupling the second upper die 101A-2, the upper spacer 123, and the first upper die 101A-1 to be discharged to the outside. That is, the upper spacer 123 is interposed between the first upper die 101A-1 and the second upper die 101A-2 to form a gap between the first upper die 101A-1 and the second upper die 101A-2 so as to form a space, into which the first electrode active material slurry supplied from the upper slurry receiving part 121 can be discharged.

The first upper die 101A-1 is located on the upper side of the second upper die 101A-2 and is coupled to the second upper die 101A-2 while the upper spacer 123 being interposed therebetween. A surface of the first upper die 101A-1, which faces the second upper die 101A-2, may be formed in parallel to the ground surface.

An upper surface of the first upper die 101A-1 may be classified into two areas. The upper surface of the first upper die 101A-1 may include a flat portion 130 located relatively far away from the upper discharge opening 105 and an inclined portion 131 extending from the flat portion 130. The flat portion 130 extends to be parallel to the ground surface and the inclined portion 131 is obliquely inclined to the lower side while having an angle of approximately 30 to 60 degrees with respect to the flat portion 130.

The first upper die 101A-1 and the second upper die 101A-2 may be formed of a metal material, and the first upper die 101A-1 and the second upper die 101A-2 may be mutually coupled to each other through bolting and the like.

FIG. 6 is a plan view illustrating the upper spacer of FIG. 5.

Referring to FIGS. 4 to 6, the upper spacer 123 may have a substantially stapler-shaped planar shape. Accordingly, the upper spacer 123 has a first opening 123A formed on one side thereof to be interposed in only the remaining parts of a periphery thereof, at which the first upper die 101A-1 and the second upper die 101A-2 face each other, except for one side thereof. Further, the first upper die 101A-1 and the second upper die 101A-2 are spaced apart from each other in an area, in which the first opening 123A is formed, to form the upper discharge opening 105 and the upper discharge opening 105 is communicated with the upper slurry receiving part 121.

Because the upper spacer 123 functions as a gasket such that the first electrode active material slurry is not leaked through an aperture between the first upper die 101A-1 and the second upper die 101A-2, except for the area in which the upper discharge opening 105 is formed, it is preferable that the upper spacer 123 is formed of a material having an elasticity that can secure sealing performance.

A through-hole 123B, through which a lower air vent 103B passes, is formed in the upper spacer 123. A detailed description of the lower air vent 103B will be described below.

FIG. 7 is a longitudinal sectional view when a vertical section along dotted line B of FIG. 4 is viewed from direction C.

Referring to FIGS. 4 and 7, the lower die 101B includes a first lower die 101B-1, a second lower die 101B-2, and a lower spacer 113. The second lower die 101B-2 is located on the lowermost side among dies constituting the slot die 101, and may be inclined such that a surface of the second lower die 101B-2, which faces the first lower die 101B-1, has an angle of approximately 30 to 60 degrees with respect to the ground surface.

The second lower die 101B-2 may include a recessed lower slurry receiving part 111, which has a predetermined depth on the surface of the second lower die 101B-2, which faces the first lower die 101B-1. The lower slurry receiving part 111 may be connected to a lower slurry supply chamber (not illustrated) to continuously receive a second electrode active material slurry. The lower slurry receiving part 111 may include a lower slurry supply port 112 communicated with the lower slurry supply chamber. The first electrode active material slurry and the second electrode active material slurry may be formed of the same component or be formed of different components according to the purpose of the manufactured electrode.

If the lower slurry receiving part 111 is fully filled with the second electrode active material slurry supplied through the lower slurry supply port 112, the second electrode active material slurry may be discharged to the outside through a lower discharge opening 106 formed by sequentially coupling the second lower die 101B-2, the lower spacer 113, and the first lower die 101B-1.

The first lower die 101B-1 is located on the upper side of the second lower die 101B-2 and is coupled to the second lower die 101B-2 while the lower spacer 113 being interposed therebetween. The first lower die 101B-1 and the second lower die 101B-2 may be inclined such that surfaces of the first lower die 101B-1 and the second lower die 101B-2, which face each other, have an angle of approximately 30 to 60 degrees with respect to the ground surface.

The first lower die 101B-1 may be obliquely inclined while an upper surface of the first lower die 101B-1, which faces the upper die 101A, has an angle of approximately 30 to 60 degrees with respect to the ground surface. In this way, the upper surface of the first lower die 101B-1 is inclined with respect to the ground surface, and may be matched with the upper die 101A having a lower surface of a shape corresponding to the upper surface of the first lower die 101B-1.

The first lower die 101B-1 and the second lower die 101B-2 may be formed of a metal material, and may be mutually coupled to each other through bolting and the like.

FIG. 8 is a plan view illustrating the lower spacer of FIG. 7.

Referring to FIGS. 7 and 8, the lower spacer 113 is interposed between the first lower die 101B-1 and the second lower die 101B-2 to form a gap between the first lower die 101B-1 and the second lower die 101B-2 so as to form a space, into which the second electrode active material slurry is discharged.

Accordingly, the lower spacer 113 has a first opening 113A formed on one side thereof to be interposed in only the remaining parts of peripheries of surfaces of the first lower die 101B-1 and the second lower die 101B-2, which face each other, except for one side thereof. Further, the first lower die 101B-1 and the second lower die 101B-2 are spaced apart from each other in an area, in which the second opening 113A is formed, to form the lower discharge opening 106 and the lower discharge opening 106 is communicated with the lower slurry receiving part 111.

Because the lower spacer 113 functions as a gasket such that the second electrode active material slurry is not leaked through an aperture between the first lower die 101B-1 and the second lower die 101B-2, except for the area, in which the lower discharge opening 106 is formed, it is preferable that the lower spacer 113 is formed of a material having an elasticity that can secure sealing performance.

Referring to FIGS. 5 and 6, the air vent 103 includes the upper air vent 103A and the lower air vent 103B. The upper air vent 103A passes through the first upper die 101A-1 to be communicated with the upper slurry receiving part 121. Accordingly, before the first electrode active material slurry in the upper slurry receiving part 121 is introduced into the upper discharge opening 105, bubbles in the first electrode active material slurry may be removed through the upper air vent 103A.

Because the upper discharge opening 105 is formed in parallel to the ground surface, even though the upper air vent 103A is communicated with any location of the upper slurry receiving part 121, bubbles included in the first electrode active material slurry may be easily discharged to the outside through the upper air vent 103A. Meanwhile, it is preferable that the upper air vent 103A is installed in a direction that is perpendicular to a direction, in which the first electrode active material slurry is discharged, and which is opposite to a direction, in which gravity is applied, so as to efficiently remove bubbles included in the first electrode active material slurry.

FIG. 9 is a plan view illustrating that the upper spacer is located on an second upper die. The location of the upper air vent 103A is indicated for convenience of description.

Referring to FIGS. 5 and 9, the upper air vent 103A may be formed at rear side portions of an area formed in the upper slurry receiving part 121 in the first opening 123A of the upper spacer 123 when the second upper die 101A-2 is viewed from the top. Here, "the rear side" refers to an opposite direction to a direction, in which the first electrode active material slurry is discharged. Then, "the side surface" refers to opposite portions in the lengthwise direction of the second upper die 101A-2, which are perpendicular to a direction, in which the first electrode active material slurry is discharged. Through the structure, the location of the upper air vent 103A does not hinder the operator's movements and facilitates the maintenance and repair of the slot die coating apparatus 100.

Referring to FIG. 7, the lower air vent 103B passes through the first upper die 101A-1, the second upper die 101A-2, and the first lower die 101B-1 to be communicated with the lower slurry receiving part 111. Accordingly, before the second electrode active material slurry in the lower slurry receiving part 111 is introduced into the lower discharge opening 106, bubbles included in the second electrode active material slurry may be removed through the lower air vent 103B.

Because the lower discharge opening 106 is inclined at an angle of 30 to 60 degrees with respect to the ground surface and has a structure, in which the second electrode active material slurry is supplied to lower slurry receiving part 111 in an opposite direction to the gravitational force in the lower slurry port 112, the largest number of bubbles are generated in portion S of the lower slurry receiving part 111, which is connected to the lower discharge part 106. Accordingly, it is preferable that the lower air vent 103B is installed in portion S.

Further, it is preferable that the angle between the lower air vent 103B and the lower discharge opening 106 is maintained at 80 to 150 degrees.

FIG. 10 is a plan view illustrating that the lower spacer is located on a second lower die. The location of the lower air vent 103B is indicated for convenience of description. FIG. 11 is a plan view of a slot die of FIG. 4. For convenience of description, a boundary of the first opening 123a of the upper spacer 123 is indicated by an alternate long and short dash line, and a boundary of the second opening 113a of the lower spacer 113 is indicated by a dotted line.

Referring to FIGS. 7, 10, and 11, it is preferable that the lower air vent 103B is installed not to pass through the upper discharge opening 105 and the upper slurry receiving part 121. When the lower air vent 103B passes through portions, at which the upper discharge opening 105 and the upper slurry receiving part 121 are formed, it may hamper flows of the first electrode active material slurry and bubbles may be formed at the passing-through portions. Accordingly, it is preferable that the lower air vent 103B is formed to pass through the location, at which the upper spacer 123 deviates from the first opening 123a. For an example, the length W1 of the first opening 123a of the upper spacer 123 is formed to be smaller than the length W2 of the second opening 113a of the lower spacer 113 so that the lower air vent 103B may be formed to pass through the through-hole 123b of the upper spacer 123.

The lower air vent 103B may be formed at portions that are close to side surfaces of the first upper die 101A-1 in the lengthwise direction of the first upper die 101A-1, which is perpendicular to a direction, in which the second electrode active material slurry is discharged. The location of the lower air vent 103B does not hamper the operator's movements and facilitates the maintenance and repair of the slot die coating apparatus 100.

In addition to the embodiment illustrated in FIG. 7, the lower air vent 103B may be formed in various directions. As an example, the lower air vent 103B may pass through the second upper die 101A-2 and the first lower die 101B-1 to be formed in a rearward direction thereof (see D of FIG. 7). In this case, because the lower air vent 103B does not pass through the upper spacer 123, it may be installed at various locations on lateral sides. Further, the lower air vent 103B may be also formed on lateral sides.

FIG. 12 is a longitudinal sectional view illustrating a modification of FIG. 5.

Referring to FIGS. 5 and 12, a slot die coating apparatus 200 may have a structure, in which a lower air vent 203B is bent in an inverse L shape. When bubbles included in the first electrode active material slurry of a low viscosity are removed, the bubbles are discharged together with the first electrode active material slurry. Then, the operator may easily receive the first electrode active material slurry that flows down through the bent upper air vent 203A. Although FIG. 12 illustrates only the bent structure that is bent in an inverse L shape, as long as the first electrode active material slurry flowing down may be easily received, the upper air vent 203A may be bent in various shapes.

Further, the upper air vent 203A may include a valve 240. As long as the valve 240 has any structure that may open and close a hollowed pipeline, it is not specifically limited.

The slot die coating apparatus 200 may have the same structure as the slot die coating apparatus 100 of FIG. 5, except for the structure, in which the upper air vent 203B is bent in an inverse L shape, and includes the valve 240. Accordingly, a description of other configurations will be omitted.

FIG. 13 is a longitudinal sectional view illustrating a modification of FIG. 7.

Referring to FIGS. 7 and 13, a slot die coating apparatus 200 may have a structure, in which a lower air vent 203B is bent in an inverse L shape. When bubbles included in the second electrode active material slurry are removed, the bubbles are discharged together with the second electrode active material slurry. Then, the operator may easily receive the second electrode active material slurry that flows down through the bent upper air vent 203B. Although FIG. 13 illustrates only a structure that is bent in an inverse L shape, as long as the second electrode active material slurry running down may be easily received, the lower air vent 203B can be bent in various shapes.

Further, the upper air vent may include a valve 240. As long as the valve 240 has any structure that may open and close a hollowed pipeline, it is not specifically limited.

The slot die coating apparatus 200 may have the same structure as the slot die coating apparatus 100 of FIG. 7, except for a structure, in which the upper air vent 203B is bent in an inverse L shape, and includes the valve 240. Accordingly, a description of other configurations will be omitted.

An installation structure of air vents 103, 203A, and 203B according to the present disclosure may be applied to the slot die coating apparatus used in a process of coating a single layer active material in FIG. 1. In this case, it may be formed as in the upper air vent 103A of FIG. 5. The relevant structure has already been described and will be omitted here.

Further, the installation structure of air vents 103, 203A, and 203B according to the present disclosure may be applied to a 3-stage slot die coating apparatus, in which the second upper die 101A-2 and the first lower die 101B-1 are integrally formed. It may have the same structure as FIGS. 5, 7, 12, and 13, except for a structure, in which the second upper die 101A-2 and the first lower die 101B-1 are integrally formed.

Further, the slot die coating apparatuses 100 and 200 according to the present disclosure may prevent contamination of the uncoated area, which is caused when intermittent coating is performed, and may also solve non-coating of an active material caused due to continuous coating. When the electrode active material slurry including bubbles is applied to an electrode in the continuous coating process, if the bubbles surrounded by slurry burst, a portion, at which the active material is not coated, is caused in the spot, such as a crater, at which the bubbles was present. In the slot die coating apparatuses 100 and 200 according to the present disclosure, because bubbles included in the electrode active material slurry are removed through the air vents 103, 203A, and 203B before the electrode active material slurry is discharged to the discharge openings 105 and 106, the non-coating of the active material can be solved.

The present disclosure can be variously applied and modified by an ordinary person in the art to which the present disclosure pertains without departing from the scope of the present disclosure, based on the above contents.

The invention claimed is:

1. A slot die coating apparatus for coating an electrode active material slurry onto an electrode collector, the slot die coating apparatus comprising:
   a coating roller;
   a lower die comprising a lower discharge part, adapted to allow for discharge of a first electrode active material slurry therethrough; and
   an upper die located on an upper side of the lower die and having an upper discharge part, adapted to allow for discharge of a second electrode active material slurry therethrough,
   wherein an upper air vent is installed in the upper die and a lower air vent is installed in the lower die,
   wherein the upper die comprises a sequentially coupled first upper die and second upper die, with an upper spacer interposed therebetween,
   wherein the lower die comprises a sequentially coupled first lower die and second lower die, with a lower spacer interposed therebetween,
   wherein the lower discharge part is disposed between the first lower die and the second lower die,
   wherein a lower slurry receiving part is formed in the second lower die,
   wherein the lower slurry receiving part is communicated with the lower discharge part, and
   wherein the lower air vent passes through the second upper die and the first lower die to be communicated with the lower slurry receiving part,
   wherein the lower air vent is located at an area between the lower slurry receiving part and the lower discharge part.

2. The slot die coating apparatus of claim 1, wherein the upper discharge part is disposed between the first upper die and the second upper die.

3. The slot die coating apparatus of claim 2, wherein an upper slurry receiving part is formed in the second upper die.

4. The slot die coating apparatus of claim 3, wherein the upper slurry receiving part is communicated with the upper discharge part.

5. The slot die coating apparatus of claim 2, wherein the upper air vent passes through the first upper die to be communicated with the upper slurry receiving part.

6. The slot die coating apparatus of claim 1, wherein the lower air vent passes through the first upper die to be communicated with the lower slurry receiving part.

7. The slot die coating apparatus of claim 1, wherein the upper spacer has a planar staple shape in which one side comprises a first opening.

8. The slot die coating apparatus of claim 1, wherein the lower air vent is installed to pass through the upper spacer.

9. The slot die coating apparatus of claim 1, wherein the upper air vent and/or the lower air vent comprises a valve.

10. The slot die coating apparatus of claim 1, wherein the upper air vent and/or the lower air vent has a bent structure.

* * * * *